US012128976B2

(12) United States Patent
Schulze

(10) Patent No.: US 12,128,976 B2
(45) Date of Patent: Oct. 29, 2024

(54) FREE-MOVING TRANSPORT CARRIAGE AND CONVEYING SYSTEM FOR CONVEYING AND TREATMENT SYSTEM FOR TREATING WORKPIECES

(71) Applicant: EISENMANN GMBH, Böblingen (DE)

(72) Inventor: Herbert Schulze, Aidlingen (DE)

(73) Assignee: EISENMANN GMBH, Boeblingen (DE)

( * ) Notice: Subject to any disclaimer, the term of this patent is extended or adjusted under 35 U.S.C. 154(b) by 147 days.

(21) Appl. No.: 17/620,179

(22) PCT Filed: Apr. 30, 2020

(86) PCT No.: PCT/EP2020/062123
§ 371 (c)(1),
(2) Date: Dec. 17, 2021

(87) PCT Pub. No.: WO2020/259899
PCT Pub. Date: Dec. 30, 2020

(65) Prior Publication Data
US 2022/0363330 A1    Nov. 17, 2022

(30) Foreign Application Priority Data

Jun. 25, 2019 (DE) .................... 10 2019 117 036.2

(51) Int. Cl.
*B62D 65/18* (2006.01)
*B62D 1/28* (2006.01)
*G05D 1/00* (2006.01)

(52) U.S. Cl.
CPC ............. *B62D 65/18* (2013.01); *B62D 1/283* (2013.01); *G05D 1/0234* (2013.01)

(58) Field of Classification Search
CPC .. B60K 1/04; B60K 7/0007; B60K 2031/005; B62D 65/19; B62D 65/18; B62D 12/02;
(Continued)

(56) References Cited

U.S. PATENT DOCUMENTS

2017/0102706 A1    4/2017  Holmberg et al.
2018/0022405 A1    1/2018  Gecchelin et al.
(Continued)

FOREIGN PATENT DOCUMENTS

AU    2012201253 A1 * 10/2012 ............ B60L 3/0015
CN    103 144 597        6/2013
(Continued)

OTHER PUBLICATIONS

Opposition filed in related EP Pat. No. 4 080 313 B1 filed Aug. 7, 2024, (27 pages including translation of relevant material provided).
(Continued)

*Primary Examiner* — Khoi H Tran
*Assistant Examiner* — Bryant Tang
(74) *Attorney, Agent, or Firm* — SCHROEDER INTELLECTUAL PROPERTY LAW GROUP, LLC

(57) ABSTRACT

A free-moving transport carriage for conveying at least one workpiece, having, in addition to a control unit, a near-field sensor arrangement which can be coupled to a track control unit, wherein the track control unit is able to determine, by means of position raw information which can be determined by the near-field sensor arrangement, a relative position of one or more points of the free-moving transport carriage with regard to one or more position information sources of a near-field travelling environment. The main orientation of the transport carriage and the variable conveying direction can be coordinated to one another by the track control unit. A conveying system for conveying at least one workpiece with at least one such free-moving transport carriage, a
(Continued)

treatment system, a treatment system having such a conveying system and a method carried out by a track control unit.

26 Claims, 8 Drawing Sheets

(58) Field of Classification Search
CPC .... B62D 47/025; B62D 47/006; B65G 35/06; B65G 2201/0267; B65G 2201/0294; B65G 17/005; B66F 9/065; B60D 1/481; B60D 1/36; B60D 1/62; B60D 47/006; B60D 12/02; G05D 1/0088; G05D 1/0297; G05D 2201/0216; G05D 1/0272; G05D 1/0236; G05D 1/0278; G05D 1/0246; G05D 1/0265
See application file for complete search history.

(56) References Cited

U.S. PATENT DOCUMENTS

| | | | | |
|---|---|---|---|---|
| 2019/0135549 | A1* | 5/2019 | Kilibarda | B65G 35/06 |
| 2020/0130115 | A1 | 4/2020 | Vetter et al. | |
| 2020/0216130 | A1 | 7/2020 | Von Krauland | |

FOREIGN PATENT DOCUMENTS

| | | | |
|---|---|---|---|
| CN | 105 480 902 | | 4/2016 |
| CN | 107 422 730 | | 1/2017 |
| CN | 207 047 615 | | 2/2018 |
| CN | 208 444 202 | | 1/2019 |
| DE | 37 09 627 | | 10/1988 |
| DE | 29 912 726 | U1 | 10/1999 |
| DE | 29 907 990 | | 12/1999 |
| DE | 10 213 843 | | 10/2003 |
| DE | 10 2008 011 539 | | 6/2009 |
| DE | 10 2011 085 019 | | 4/2012 |
| DE | 10 2011 109 532 | | 2/2013 |
| DE | 20 2013 004 209 | U1 | 7/2013 |
| DE | 10 2012 023 999 | | 1/2014 |
| DE | 10 2013 211 414 | | 12/2014 |
| DE | 10 2013 113 729 | | 6/2015 |
| DE | 10 2016 014 882 | | 6/2017 |
| DE | 10 2017 103 931 | | 8/2018 |
| DE | 10 2017 003 528 | | 10/2018 |
| DE | 10 2017 113 343 | | 12/2018 |
| EP | 0 718 179 | A1 | 6/1996 |
| FR | 2976525 | A1 * | 12/2012 ............... B60K 1/04 |
| WO | 2016/102130 | | 6/2016 |

OTHER PUBLICATIONS

G. Ullrich: Fahrerlose Transportsysteme—2. Auflage, 2014 (251 pages including translation of cited material provided; translation of cited pp. 150-155 provided herewith).

Opposition filed in related EP Pat. No. 4 080 313 B1 filed Sep. 6, 2024, (41 pages including translation of relevant material provided).

G. Ullrich: Fahrerlose Transportsysteme—2. Auflage, 2014 (Full Document Previously Submitted on Aug. 21, 2024; translation of additional cited pp. 109, 119-21, and 156 provided herewith).

R. Bostelman, T. Hong: Review of Research for Docking Automatic Guided Vehicles and Mobile Roberts; Oct. 2016.

H. Roth, K. Schilling: Navigation and Docking Maneuvers of Mobile Robots in Industrial Environments; 1998.

P. Mira et al.: Docking of a Mobile Platform Based on Infrared Sensors; 1997.

* cited by examiner

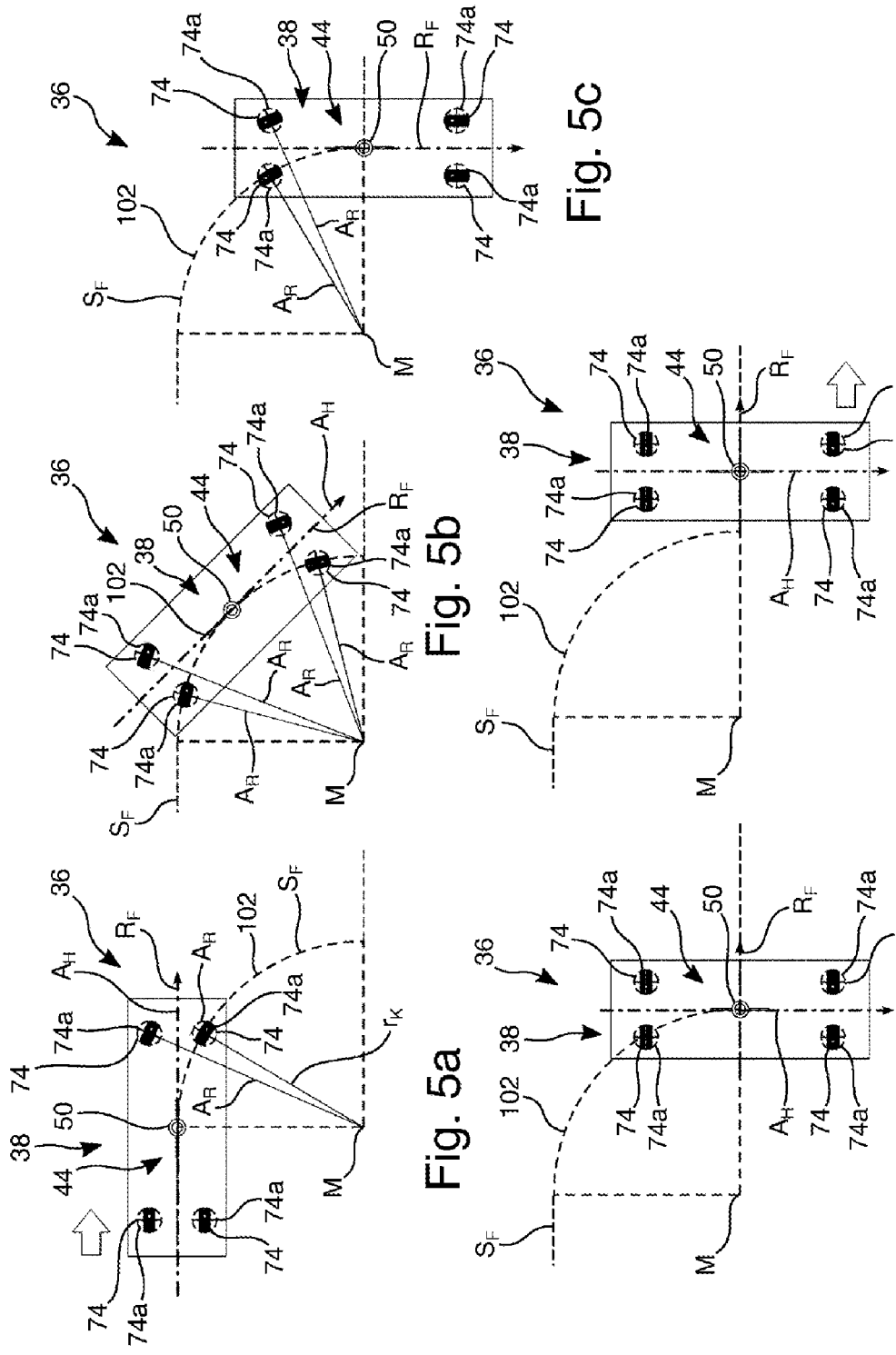

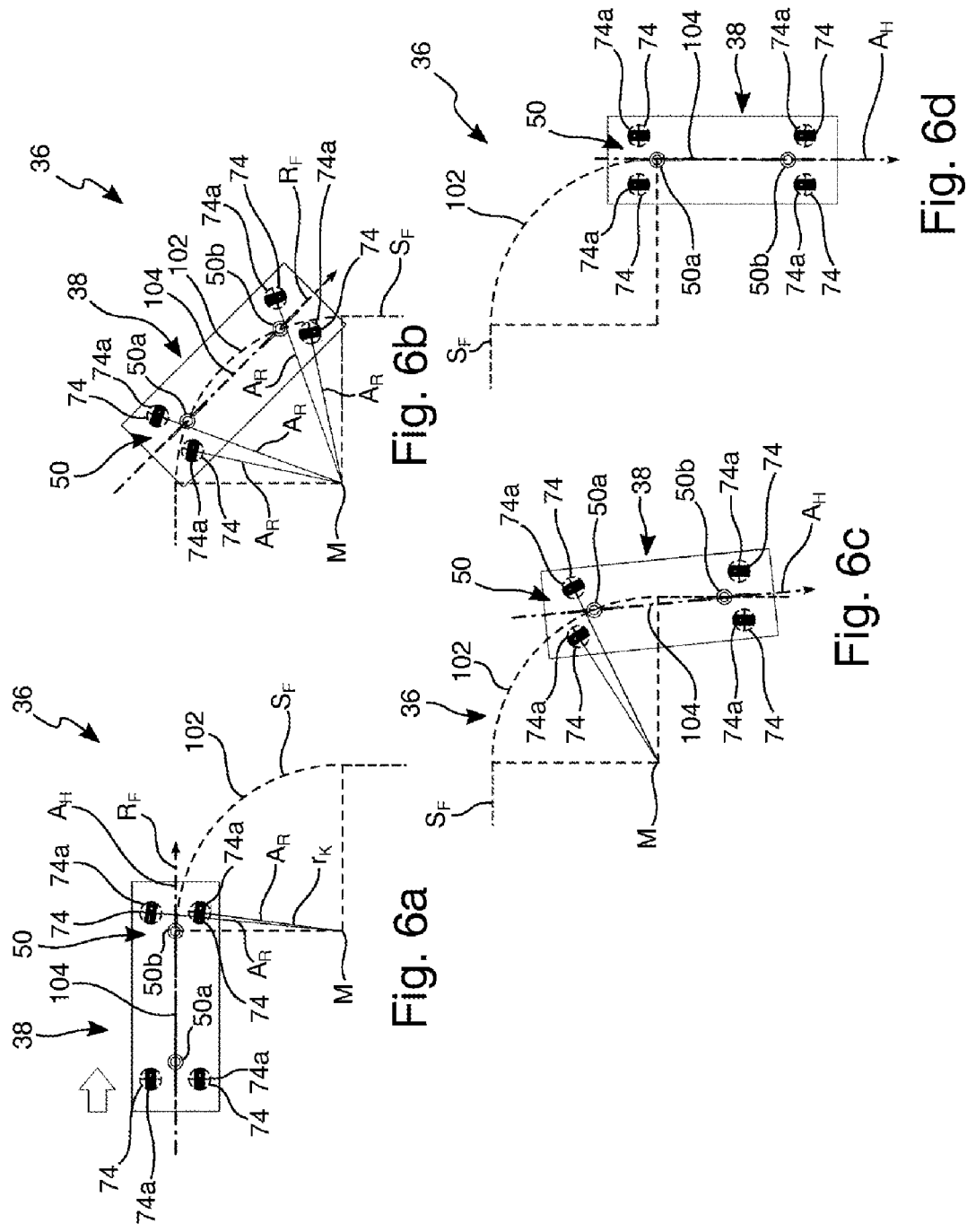

FREE-MOVING TRANSPORT CARRIAGE AND CONVEYING SYSTEM FOR CONVEYING AND TREATMENT SYSTEM FOR TREATING WORKPIECES

RELATED APPLICATIONS

This application is a § 371 national phase of International Patent Application No. PCT/EP2020/062123 filed Apr. 30, 2020, which claims the filing benefit of German Patent Application No. 10 2019 117 036.2 filed Jun. 25, 2019, the contents of both of which are incorporated herein by reference.

BACKGROUND TO THE INVENTION

1. Field of the Invention

The invention relates to a free-moving transport carriage for conveying at least one workpiece, in particular for conveying at least one vehicle body, along a conveying route in variable conveying directions, having
- a) a chassis, which defines a main axis and main alignment of the transport carriage, a fastening device for at least one workpiece and a connecting device, which couples the chassis to the fastening device; and
- b) a control device, which is designed to control the chassis along the conveying route depending on position information which is provided by at least one position information transmitter.

The invention moreover relates to a conveying system for conveying at least one workpiece along a conveying route in variable conveying directions, having at least one such free-moving transport carriage.

The invention furthermore relates to a treatment system for treating workpieces, in particular for treating vehicle bodies, having
- a) a conveying system, which comprises a plurality of free-moving transport carriages with which at least one workpiece in each case can be conveyed along a conveying route in variable conveying directions; wherein
- b) each free-moving transport carriage comprises in each case:
  - ba) a chassis, which defines a main axis and main alignment of the free-moving transport carriage, a fastening device for at least one workpiece and a connecting device, which couples the chassis to the fastening device; and
  - bb) a control device, which is designed to control the chassis along the conveying route depending on position information which is provided by at least one position information transmitter;
- c) a movement space is present along the conveying route, which movement space is connected to a workpiece conveying space via a connecting passage, wherein the chassis can be moved in the movement space so that the fastening device is also moved in the workpiece conveying space and the connecting device extends through the connecting passage.

The invention furthermore relates to such a treatment system having an inventive conveying system and a method executed by a track control unit of a treatment system for treating workpieces and/or a free-moving transport carriage for conveying at least one workpiece.

2. Description of the Prior Art

In treatment systems of the type mentioned at the outset, one or more treatment devices are arranged along the conveying route, which treatment devices can be in particular a coating booth, a dryer or a workstation. In this case, the workpieces can be treated with materials or media, for example painted, in a treatment device or assembled or mechanically processed, for example sanded or polished, in a workstation. For vehicle bodies, a workstation can be formed in particular by an assembly station in which the body shell is equipped with the vehicle components.

A harmful atmosphere for the conveying technology may develop in the conveying space during the treatment of the workpieces. Since the movement space for the conveying technology and the conveying space for the workpieces are only connected to one another by the connecting passage, atmospheric transfer between the spaces can be reduced in particular in conjunction with suitable shielding means at the connecting passage so that the conveying technology in the movement space is not subject to excessive damage from the harmful atmospheres.

Transport systems having free-moving transport carriages are also commonly known to a person skilled in the art as "driverless transport systems" or DTS. Free-moving transport carriages are floor-based, i.e. their chassis runs along a floor, and they can be driven and steered independently of one another. An associated position information transmitter can be a known pathfinding system. This can comprise path markers fixed on or in the floor, an internal GPS and/or matrix-based position information transmitter, for example. Optical far-field sensors, with which a collision with obstacles located on the conveying route can be prevented, are also additionally or alternatively possible. In this case, the basic control commands, such as movement requests, target location etc. are generally coordinated by a superordinate central control.

In vehicle production in particular, it is desirable to use a DTS from the coating of the vehicle bodies to the final assembly of the vehicles. It is thus possible to avoid changing the transport means, which reduces costs and increases the efficiency.

In general terms, if the conveying direction of a transport carriage varies, a forward facing direction vector changes. In curved sections of the conveying route, the conveying direction at a position of the transport carriage in the curve always describes a tangential vector extending perpendicularly to the radius of the curvature of the curve.

The main axis and main alignment of the free-moving transport carriage is based in each case on the forward movement of the transport carriage with respect to a specified front of the transport carriage. This means that, even in the case of cubic and/or omnidirectionally movable free-moving transport carriages, the main axis and the main alignment always face in the direction of this specified vehicle front and the resultant forward movement.

Treatment systems in which conveying systems with free-moving transport carriages are used have the advantage that they can be matched with maximum flexibility to different workpieces, changes in production sequences and the like. There is moreover no need to install a network of rails, electric tracks or the like which spans the entire treatment system, since the free-moving transport carriages can roll directly along the system floor.

For navigation and coordination of the individual free-moving transport carriages, path markers are frequently fixed on the system floor, which path markers can additionally comprise special markers for individual routes along which the free-moving transport carriages should move, for example. To detect these path markers and to detect obstacles along or on the conveying route, the free-moving transport carriages conventionally have an individual far-field sensor arrangement. This comprises path marker sensors for the path markers on the one hand and, on the other, obstacle sensors with which obstacles at a relatively long distance from the transport carriage can also still be detected. However, this far-field sensor arrangement is disadvantageous in that it does not operate adequately in a tight space, in particular in the separate movement space for the free-moving transport carriage. It may thus occur that, with a delimitation of the movement space, the far-field sensor arrangement, upon entry into a movement space, generates signals similar to those for an obstacle which is positioned along or on the conveying route. In the worst case, this can result in a control device interpreting this as an obstacle and generating a stop instruction. This results in a temporary production standstill.

In the case of free-moving transport carriages of the type mentioned at the outset, unfavorable collisions between the connecting device and the connecting passage can moreover occur. In this case, such a risk of collisions is especially increased in curved sections of the conveying route. Upon contact between the connecting device and the connecting passage, a tilting of the system and damage to the transport carriage may occur in the worst case. On the one hand, this reduces the efficiency of the treatment system since the transport carriages can no longer move without friction in the curved sections as a result of the collisions which occur. On the other, the wear is increased both on the connecting passage and on the connecting device, which can involve costly maintenance work.

SUMMARY OF THE INVENTION

The object of the invention is therefore to specify a free-moving transport carriage, a conveying system, a treatment system and a method executed by a track control unit, which counter the disadvantages, explained above, of the prior art.

In the case of a free-moving transport carriage of the type mentioned at the outset, the object is achieved in that
  c) in addition to the control device, the transport carriage has a near-field sensor arrangement, which can be coupled to a track control unit, wherein, via position raw information which can be determined by the near-field sensor arrangement, the track control unit can determine a relative position of one or more points of the free-moving transport carriage with regard to one or more position information sources of a near-field movement environment; and
  d) the main alignment of the transport carriage and the conveying direction can be adapted to one another by the track control unit.

It has been identified according to the invention that, with the aid of such a near-field sensor arrangement, the free-moving transport carriage can be moved more easily along a conveying route along which there are obstacles, or objects which could be interpreted as obstacles by the control device. Owing to the additionally present near-field sensor arrangement, it is likewise possible to configure the conveying route with particular flexibility and according to the requirements; for example, the conveying route can have one or more curved sections.

So that the free-moving transport carriage can be adapted with particular flexibility to the variable conveying directions, it is favorable if the track control unit is arranged on or in the free-moving transport carriage. In particular, when a plurality of free-moving transport carriages of the same type are present, it can be particularly advantageous if each one can be adapted to the variable conveying directions independently of the other free-moving transport carriages. This is particularly advantageous in that a superordinate track control unit which coordinates all free-moving transport carriages is not required. Consequently, the main alignments of the free-moving transport carriages and the respective conveying direction can be adapted to one another with particular flexibility and individually on the basis of one or more position information sources of the near-field movement environment.

It is particularly favorable if the near-field sensor arrangement comprises at least one camera or an optical scanner, in particular a laser scanner, and/or at least one ultrasound sensor and/or at least one radar sensor, which is arranged on the free-moving transport carriage and, by means of a camera image and/or optically scannable structures and/or reflective structures, can determine position raw information which can be processed into position information by the track control unit. Position raw information can then comprise a brightness value or contrast value, for example. It can additionally or alternatively contain an edge image, for example of the course of the connecting passage, a reflection, absorption and/or polarization spectrum, and/or complex marker information, for example information of a barcode or the like.

Additionally or alternatively, it can be advantageous if the near-field sensor arrangement comprises a force sensor arranged on the connecting device or on a chassis housing, which is designed to detect if the connecting device strikes an edge or an inside surface of the connecting passage and/or a delimitation of the movement space. The position raw information can then be a force measured by the force sensor. By way of example, the force sensor can be designed as a strain gauge or measuring sensors or the like.

It can moreover be advantageous if the near-field sensor arrangement additionally or alternatively comprises a rotary encoder, which is designed to indicate a rotary position of at least one wheel arrangement of the free-moving transport carriage. The position raw information can then be an angle, or the like, provided by the rotary encoder.

The chassis advantageously has one or more actively rotatable wheel arrangements in each case, which
  a) are each actively rotatable about an axis of rotation, which extends perpendicularly, in particular vertically, to a wheel suspension axis, and
  b) are coupled to the track control unit via a rotary drive in such a way that the track control unit, depending on the position raw information which can be determined by the at least one near-field sensor arrangement, activates one or more rotary drives in such a way that the respectively activated rotary drive induces a rotation of the corresponding wheel arrangement about the axis of rotation.

This means that, in this advantageous variant, the track control unit receives position raw information from the near-field sensor arrangement, on the basis of which the rotary drive(s) for the one or more wheel arrangements can be controlled.

It is therefore possible, for example, to adapt the rotary position of the wheel arrangement to a target rotary position at a particular point along the conveying route by means of a rotary value, for example of an angle, which can be determined by the rotary encoder for the respective wheel arrangement, and to consequently follow a predetermined route.

In this regard, it is particularly favorable if one, more or all actively rotatable wheel arrangements can be rotated individually by means of the track control unit. It is thus possible, in a curved section of the conveying route, to direct the wheel suspension axes of the wheel arrangements in each case individually toward a curvature center point of the curved section.

The object mentioned at the outset is achieved in a conveying system for conveying at least one workpiece of the type mentioned at the outset in that the conveying system comprises at least one free-moving transport carriage with some or all of the above-mentioned features.

The object explained above is achieved in a treatment system of the type mentioned at the outset in that d) in addition to the control device of the free-moving transport carriage, the treatment system has a mechanical and/or sensor-dependent track assistance device, which is designed to actively and/or passively adapt the main alignment of the free-moving transport carriage and the conveying direction to one another on the basis of at least one parameter which is dependent on the connecting passage.

According to the invention, it has been identified that, with the aid of such a track assistance device, the connecting devices extending through the connecting passage of the treatment system can be guided through the connecting passage along the conveying route more safely, i.e. substantially without collisions. As a result of the additionally present track assistance device, it is furthermore possible to configure the conveying route in the treatment system with particular flexibility and according to the requirements. Routes are therefore possible which were previously not possible owing to the lacking adaptation of the conveying direction and the main alignment of the free-moving transport carriage. A curved route through a treatment device is therefore possible, for example, wherein the workpieces can then likewise be treated in curved regions. The connecting passage can moreover be kept particularly narrow as a result of the invention, whereby the movement space can, for example, be shielded more effectively against harmful atmospheres from the workpiece conveying space.

In the case of the track assistance device, it is particularly advantageous if the parameter which is dependent on the connecting passage is at least indirectly a) the course of an edge and/or an inside surface of the connecting passage in the conveying direction; and/or b) the inclination of an inside surface of the connecting passage with respect to a vertical plane extending in the conveying direction; and/or c) the local width of the connecting passage.

The local width is understood to be the spacing from one edge or inside surface of the connecting passage to an opposite edge or inside surface, which is generally perpendicular to the conveying direction. The width of the connecting passage is preferably constant along the conveying route.

The main alignment of the free-moving transport carriages and the conveying direction can preferably be adapted to one another by the track assistance device in such a way that a) after or during an adaptation of the free-moving transport carriage, the main alignment always extends or is kept parallel or perpendicular to the conveying direction; and/or b) after or during the adaptation, at least a section of the connecting device, which extends through the connecting passage, is, or is kept, at a predetermined tolerance distance from at least an edge and/or an inside surface of the connecting passage.

On the whole, it is thus possible to keep the section of the connecting device at a respective predetermined tolerance distance from one or both edges and/or inside surfaces of the connecting passage. The section of the connecting device which extends through the connecting passage can be, for example, a rod or strut or the like.

This tolerance distance is preferably at least 3 to 7 mm, preferably at least 6 to 9 mm and particularly preferably at least 8 to 14 mm.

In a particularly preferred configuration, a center of a maximum cross-sectional extent of the section of the connecting device can be kept on a center line of the connecting passage. The center line of the connecting passage is understood to be a hypothetical line in the connecting passage and in the conveying direction, which is always at the same distance from both edges and/or inside surfaces of the connecting passage.

It is furthermore favorable in the case of the treatment system if a) for the active adaptation of the main alignment and the conveying direction to one another, the track assistance device has at least one near-field sensor arrangement, which is coupled to a track control unit, wherein b) via position raw information which can be determined by the near-field sensor arrangement, the track control unit can at least indirectly determine a relative position of one or more points of the free-moving transport carriages in each case with regard to one or more parameters which are dependent on the connecting passage. The position raw information can be processed into position information by the track control unit.

In this context, active adaptation is understood such that at least one drive is present in order to adapt the main alignment of the free-moving transport carriage and the conveying direction to one another.

In this case, the position information, which can be determined by means of the position raw information, preferably comprises information from at least one of the following groups: position of at least an edge and/or inside surface of the connecting passage, position of a center line of the connecting passage, distance of the connecting device from at least an edge and/or inside surface of the connecting passage. For meaningful position information, it can likewise be necessary to include specified target values or further measuring information in the determination process.

The position information is preferably compared with target values in order to be able to perform an adaptation of the main alignment to the variable conveying direction depending on the comparison result. These target values can be information from at least one of the following groups: target course of an edge and/or inside surface of the connecting passage, target course of a center line of the connecting passage, tolerance distance of the connecting device from at least an edge and/or inside surface of the connecting passage.

The treatment system with one, more or all of the above-mentioned features preferably has an inventive conveying system.

For passive adaptation of the main alignment and the conveying direction to one another along the conveying route, the track assistance device preferably provides one or more mechanical guide structures, which can exert a guiding resistance in each case on the free-moving transport carriages.

In this context, passive adaptation is understood such that a separate drive is not necessarily needed to adapt the main alignment of the free-moving transport carriage and the variable conveying direction to one another.

Guide structures can ideally be formed by
a) one or more chassis guide structures, which are arranged within the movement space, in particular on a floor within the movement space, and which can exert the guiding resistance on the chassis, wherein the axis of rotation extends perpendicularly, in particular vertically, to a wheel suspension axis; and/or
b) by a delimitation of the movement space, which can exert the guiding resistance on a chassis housing of the chassis.

These chassis guide structures can be formed for example via guide plates extending such that they are adapted to the course of the connecting passage. It is, however, also possible to provide corresponding channels or similar depressions, in which the chassis moves, in the floor.

To additionally prevent possible collisions between the connecting device and the connecting passage, it can be advantageous if a contact element, in particular a rolling or sliding element, is arranged on the connecting device, which can roll or slide along at least an edge and/or inside surface of the connecting passage.

In one variant, the force sensor already mentioned with respect to the free-moving transport carriage can be arranged in or on the rolling or sliding element. As mentioned above, this force sensor can also be designed as a measuring sensor, for example. An embodiment in which the measuring sensor is positioned ahead of the connecting devices in the movement direction of the free-moving transport carriages in each case is particularly conceivable. The measuring sensor then detects deviations from one of the above-mentioned target values, at least in parts of the route, by registering contact.

A force sensor designed as a strain gauge can, for example, additionally or alternatively also be arranged on the connecting device in such a way that it registers minimal reversible deflections thereof as it slides or rolls along the connecting passage or if it strikes this latter.

The conveying system of the treatment system having the mechanical guide structures through which passive adaptation can take place is preferably an inventive conveying system which has at least one track control unit for the active adaptation of the main alignment to the varying conveying direction.

To increase the efficiency of the treatment system in a particularly favorable manner, it is advantageous if active and passive components of the adaptation of the main alignment of the transport carriage and the conveying direction to one another can be superimposed. In other words, this means that mechanical elements of the track assistance device and sensor-dependent elements of the track assistance device are each present and the adaptations can take place in succession or at the same time.

According to a further aspect of the invention, the object is achieved in that the treatment system having some or all of the above-mentioned features is part of a manufacturing system for workpieces, in particular for vehicle bodies.

According to a further aspect of the invention, the above-mentioned object is achieved by the use of a free-moving transport carriage in a treatment system for treating workpieces, in particular for treating vehicle bodies, wherein the free-moving transport carriage has some or all of the features mentioned above with respect to the free-moving transport carriage.

In the case of the above-mentioned method, the object is achieved in that the method comprises the following steps:
a) receiving position raw information, which can be provided by a near-field sensor arrangement which is arranged in particular on the free-moving transport carriage;
b) processing the position raw information into position information with which a relative position of one or more points of the free-moving transport carriage can be determined on the basis of one or more parameters which are dependent on a movement environment, in particular of a connecting passage and/or a movement space of the treatment system;
c) generating a position correction instruction depending on the determined position information, wherein the position correction instruction induces an adaptation, in particular a matching, of a main alignment, which is defined by a chassis of the free-moving transport carriage, and the variable conveying direction.

It is advantageous if the near-field sensor arrangement supplies the track control unit with raw information from
a) at least one camera or at least one optical scanner, in particular a laser scanner, which is arranged on the free-moving transport carriage and determines the position raw information from above the connecting passage and/or from below the connecting passage by means of a camera image or optically scannable structures; and/or
b) at least one force sensor is provided, which is arranged on a connecting device or on a chassis housing of the free-moving transport carriage and detects if the connecting device strikes an edge or an inside surface of the connecting passage and/or a delimitation of the movement space.

As a result of the position correction instruction, at least one rotary drive, which is connected to an actively rotatable wheel arrangement via an axis of rotation extending perpendicularly, in particular vertically, to a wheel suspension axis of the wheel arrangement, is preferably activated in such a way that the rotary drive induces a rotation of the corresponding wheel arrangement about the axis of rotation. In the case of a free-moving transport carriage which has at least two actively drivable wheel arrangements, a position correction instruction can preferably additionally or alternatively also induce the wheel arrangements to be driven in opposite directions, whereby an adaptation of the main alignment to the variable conveying direction takes place.

It is favorable if, as a result of the position correction instruction, the at least one rotary drive is activated in such a way that the wheel suspension axis, in a curved section of the conveying route, remains directed toward a curvature center point of the curved section. This means that continuous adaptation of the main alignment to the changing tangential vectors of the variable conveying direction takes place during the conveying movement of the free-moving transport carriage. Particularly fluid cornering of the free-moving transport carriage can therefore be ensured in a particularly tight space.

The implemented position correction instructions can be stored in a correction log which can be transmitted to the above-mentioned central control, which can calculate a corrected base movement path for the traveled section for subsequent transport carriages and can relay this accordingly to successive transport carriages. Such correction logs can possibly also be exchanged between two or more transport carriages so that a corrected base movement path can be calculated by the control of a transport carriage, which control moves with the said transport carriage. The corrected base movement path is then also optionally modified again by position correction instructions if this is required.

The control device conventionally controls the free-moving transport carriages in sections of the conveying route in which there is no division between the movement space for the chassis and the workpiece conveying space. As a result, in sections of the conveying route which are notable for a narrowing of the movement space and a connecting passage from the movement space to the workpiece conveying space, it may arise that the control device and the track control unit compete with one another in terms of instruction authority. It is particularly advantageous if the track control unit completely or partially blocks control instructions of the control device for the chassis of the free-moving transport carriage on the basis of one or more specified decision parameters. Potential production standstills are thus prevented, which may arise for example as result of the control device stopping the transport carriage owing to the detected narrowing and the transport carriage remaining stationary.

In this case, such a decision parameter can be calculated for example on the basis of a specified brightness value or contrast value, a certain position of an edge in an edge image, a specified reflection, absorption or polarization spectrum and/or a specified value of the force sensor. In this case, the decision parameter(s) for blocking the control device can be identical to the position information already explained above, according to which a position correction instruction takes place.

BRIEF DESCRIPTION OF THE DRAWINGS

Exemplary embodiments of the invention are explained in more detail below with reference to the drawings, in which:

FIGS. 5a to 5e show views of the free-moving transport carriage according to FIG. 4c from above, wherein the transport carriage is shown in multiple phases of movement along a curved section of a conveying route and wherein a main alignment of the transport carriage and the conveying direction are adapted to one another in all phases;

FIGS. 6a to 6d show views of a free-moving transport carriage according to FIGS. 5a to 5d, wherein, in the transport carriage, two vertical struts of a connecting device extend through the connecting passage;

DESCRIPTION OF PREFERRED EXEMPLARY EMBODIMENTS

Figure 1A:
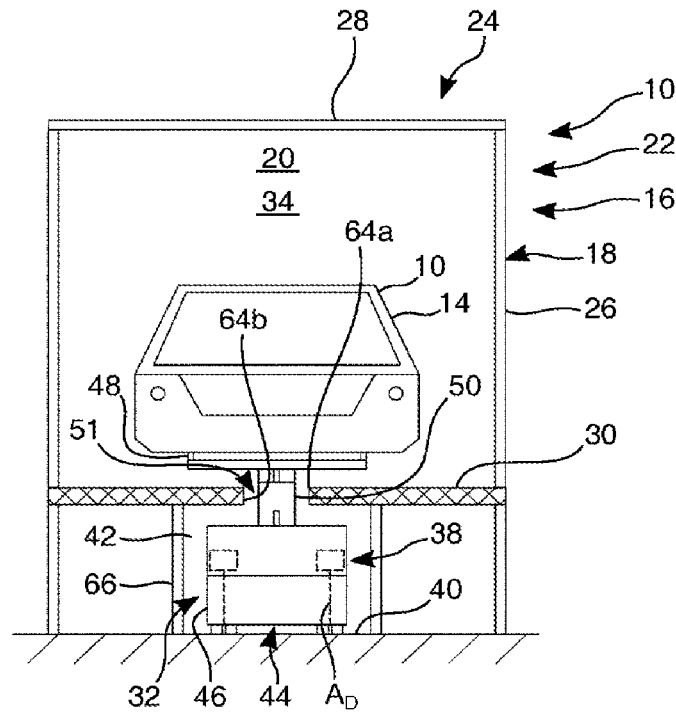
FIGS. 1a and 1b show a cross-section and a partial longitudinal section of a treatment system, known from the prior art, for treating workpieces, having a workpiece conveying space, which is connected to a movement space for a conveying system by a connecting passage, which movement space is arranged below the connecting passage, with which conveying system the workpieces are conveyed along a conveying route in variable conveying directions, wherein the conveying system comprises a plurality of free-moving transport carriages.
Figure 1B:
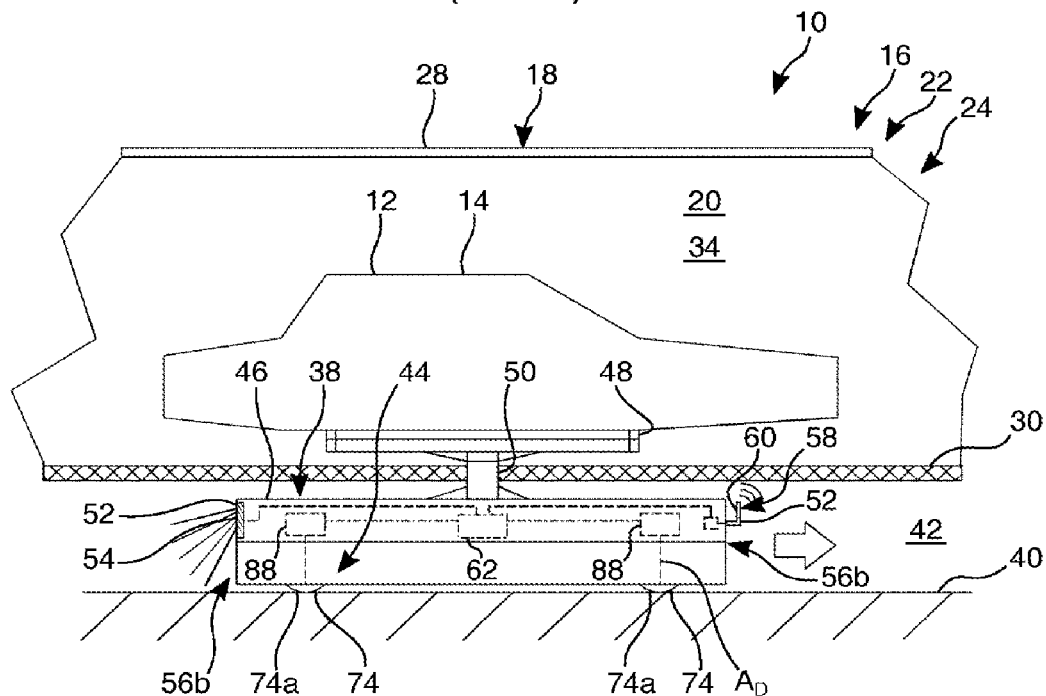

FIGS. 1a and 1b schematically illustrate a treatment system, denoted as whole by 10, for treating workpieces 12, which is known per se and is also used in the present case unless differences are clarified. The workpieces 12 are shown by way of example as vehicle bodies 14.

The treatment system 10 comprises a treatment device 16 having a housing 18, which defines a treatment space 20. A drying, pre-treatment or coating step, for example a painting step, for the workpieces 12 can be executed in the treatment device 16. The treatment device 16 can, however, likewise be a production device 22, in which assembly steps and/or quality control, for example for controlling the coating quality, or the like, can be executed.

The invention is explained below using the example of a treatment device 16, in which the treatment space 20 is designed as a treatment tunnel 24 and comprises two tunnel walls in the form of side walls 26 and two further tunnel walls in the form of a ceiling 28 and a floor 30. The treatment device 16 can alternatively also be open to the top and be without side walls 26 and a ceiling 28. Irrespective of its specific design, i.e. whether open or closed, the treatment space 20 has a floor 30 in all cases.

The workpieces 12 are conveyed along a conveying route $S_F$ in variable conveying directions $R_F$ by a conveying system 32. In the present exemplary embodiment, the workpieces 12 are conveyed through the treatment space 20, i.e. through the treatment tunnel 24 of the treatment device 16 here, and also outside the treatment device 16; in the latter case, for example, between two treatment devices 16 which are present along the conveying route $S_F$ or on the path toward a treatment device 16 or on the path away from a treatment device 16, for example also to a storage region of the treatment system 10.

The workpieces 12 move along the conveying route $S_F$ in a workpiece conveying space 34 above the floor 30, which extends along the conveying route $S_F$. The floor 30 can also be present in front of and/or behind each of the treatment devices 16 present. In the region of the treatment device 16, the workpiece conveying space 34 coincides with the workpiece treatment space 20. The workpiece conveying space 34 can consequently likewise be open or closed.

Figure 7:
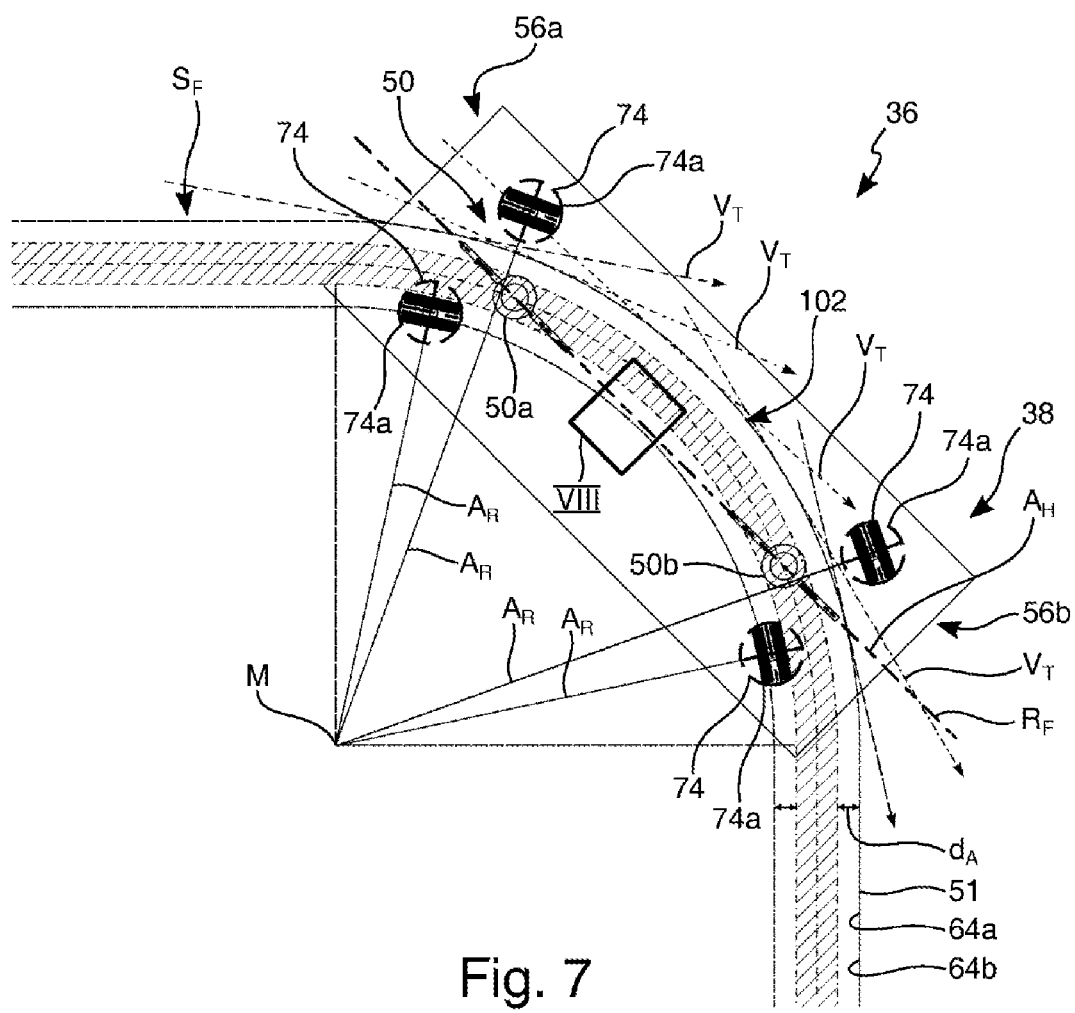
FIG. 7 shows a detailed view of the free-moving transport carriage in the curved section according to FIG. 6b, wherein different conveying directions and tolerance distances from edges and/or inside surfaces of the connecting passage are shown.

The conveying route $S_F$ can comprise one or more curved regions 36, which are illustrated in FIGS. 5a to 8. One or more curved regions 36 can be present in the region of a treatment device 16. However, they can also be present outside the treatment device 16, for example to convey workpieces 12 in a meandering manner through the treatment system 10. In the curved regions 36 of the conveying route $S_F$, the conveying direction $R_F$ always describes a tangential vector $V_T$ extending perpendicularly to a radius $r_K$ of the curvature of the curve. These tangential vectors $V_T$ are shown in FIG. 7; this will be discussed in greater detail below.

The treatment device 16 in the present exemplary embodiment is operated continuously and accordingly has an entry at a front end and an exit at the opposite end, which are not identified in the figures. The entry and the exit can be designed as a lock, as is known per se from the prior art. The treatment device 16 can, however, also be configured as a batch system and possibly have only a single access via which the workpieces 12 are conveyed into the treatment space 20 and out of this again after the treatment. This single access can possibly also be designed as a lock.

The conveying system 32 comprises a plurality of free-moving transport carriages 38, of which only one is illustrated in the figures. On the free-moving transport carriages 38, the workpieces 13 are conveyed through the treatment device 16 along the conveying route $S_F$ in the transport direction $R_F$. The transport carriages 38 move on a floor 40 within a movement space 42 arranged below the workpiece conveying space 34 and are floor-based. Conveying systems having free-moving transport carriages 38 are also known to a person skilled in the art as "driverless transport systems" or DTS for short, which are notable in that the transport carriages can be driven and steered independently of one another.

Each transport carriage 38 comprises a chassis 44 having a chassis housing 46, which at least partially delimits the chassis 44 to the outside. The chassis 44 defines a main axis (only illustrated in FIGS. 5a to 7) and a main alignment $A_H$. In the present exemplary embodiments of the free-moving transport carriage 38, the main axis is the longitudinal axis, which, with respect to the exemplary embodiment shown, shall also be specifically referred to below as a longitudinal axis.

However, the specific main alignment $A_H$ of the transport carriages 38 in each case is generally always orientated in the direction in which the free-moving transport carriage 38 moves forward with respect to a specified front. This definition is relevant, for example, in exemplary embodiments (not shown) of the free-moving transport carriage 38 which have a substantially cube-shaped form and/or substantially square footprint. It is therefore entirely possible for the main alignment $A_H$ and the conveying direction $R_F$ to extend at an angle to one another depending on which direction the free-moving transport carriage 38 moves. This applies especially if the transport carriage 38 does not move forward with respect to the specified front. This distinction is particularly relevant in the case of omnidirectionally movable free-moving transport carriages 38; for example, the longitudinal axis and main alignment $A_H$ and the transport direction $R_F$ form an angle of 90° when an omnidirectional transport carriage 38 with a specified front is moved transversely sideways.

The transport carriage 38 comprises a fastening device 48 on which a workpiece 12 can be fastened and conveyed through the workpiece conveying space 34. A connecting device 50 couples the fastening device 48 to the chassis 44, possibly to the outside of the chassis housing 46. The connecting device 50 extends through a connecting passage 51, which connects the workpiece conveying space 34 to the movement space 42. Such a connecting passage 51 is needed in particular because harmful atmospheres from the treatment space 20 need to be kept away from the movement space 42. In the case of a paint booth, such harmful atmospheres can be loaded with paint particles caused by overspray, for example. However, in the case of a dryer, the harmful atmosphere can also be brought to a temperature and/or laden with contaminants such that too long an exposure of the transport carriage 38 to this atmosphere could cause notable damage to the transport carriage 38. In the exemplary embodiments shown in FIGS. 1 to 5, the connecting device 50 is formed by a single vertical strut.

In exemplary embodiments of the connecting passage 51 which are not illustrated separately, this has a shielding device, which can have an imbricate or lamellar structure, for example. Such a structure enables a movable passage window, which is opened by the connecting device 50 during the transportation along the conveying route $S_F$ and closes behind this again. Therefore, although the connecting device 50 can move along the conveying route $S_F$ through the connecting passage 51, in this case, the transport carriage 38 remains substantially shielded from the harmful atmosphere.

The transport carriage 38 receives position information from a position information transmitter 52, with which the free-moving transport carriage 38 can be navigated in the treatment system 10 in a coordinated manner. The position information transmitter 52 can be designed as a far-field sensor arrangement 54, for example, and arranged on the transport carriage 38. As mentioned at the outset, amongst other things, it is possible for the transport carriage 38 to avoid obstacles along the conveying route $S_F$ with the aid of obstacle sensors and additionally or alternatively to follow path marker elements (not shown separately) by means of path marker sensors. The far-field sensor arrangement 54 is illustrated in a rear region 56a of the transport carriage 38 in FIG. 1b.

The position information transmitter 52 can be an internal GPS system 58, which is merely represented by a GPS receiving antenna 60 arranged in a front region 56b of the transport carriage 38. To be able to process the position information provided by the far-field sensor arrangement 54 and/or the GPS system 58, a control device 62 is moreover moved with the transport carriage 38.

By means of the control device 62, each transport carriage can process the position information provided by the far-field sensor arrangement 54 and/or the GPS system 58 individually in such a way that it moves autonomously along the conveying route $S_F$ through the treatment system 10. The control device 62 can be fully autarkic. It is also possible that the control device 62, and also the GPS system 58, communicate with an above-mentioned internal central control at a higher hierarchy level. The position information determined by the far-field sensor arrangement 54 of each transport carriage 38 is then sent to this central control for processing, for example via GPS, W-LAN or the like, which central control in turn relays corresponding control instructions to the control device 62 of the free-moving transport carriages 38.

Figure 2A:
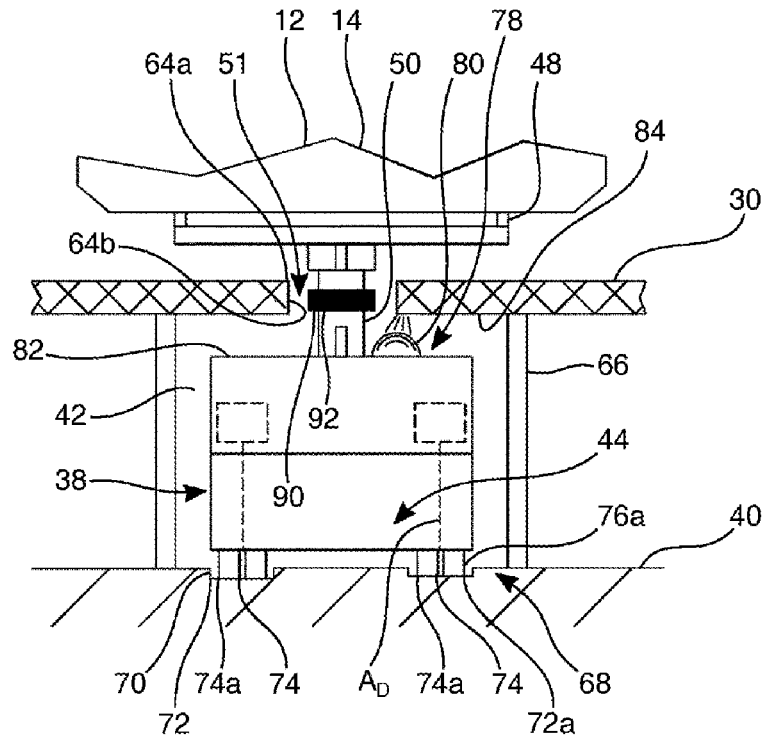
FIGS. 2a and 2b each show an enlarged detail of a cross-section corresponding to FIG. 1a and a longitudinal section corresponding to FIG. 1b of a treatment system with a first exemplary embodiment of an inventive track assistance device.

In the case of such a control device 62, which is known per se and from the prior art, difficulties may arise when the connecting device 50 has to be guided along and in the connecting passage. Amongst other things, the problem arises that the connecting device 50 may collide with an edge 64a and/or an inside surface 64 of the connecting passage 51, as shown in FIGS. 1a and 2a. This results in wear both on the connecting passage 51 and on the connecting device 50.

A further problem of a known control device 62 of this type is that, depending on the precise design of the far-field sensor arrangement 54 or the GPS system 58 of the treatment system, it is possible that only very approximate position determination is enabled in each case.

It may thus occur, for example, that an obstacle which is allegedly located on the conveying route $S_F$ is identified via the far-field sensor arrangement 54, whereupon the transport carriage 38 stops even though the obstacle is actually near to the conveying route $S_F$. It may also occur that the transport carriage 38 stops at the entry into a movement space 42 of a treatment device 16 since a movement space delimitation 66 (shown in FIGS. 1a, 2a and 3a) has been incorrectly identified as an obstacle by means of the far-field sensor arrangement 54.

Figure 2B:
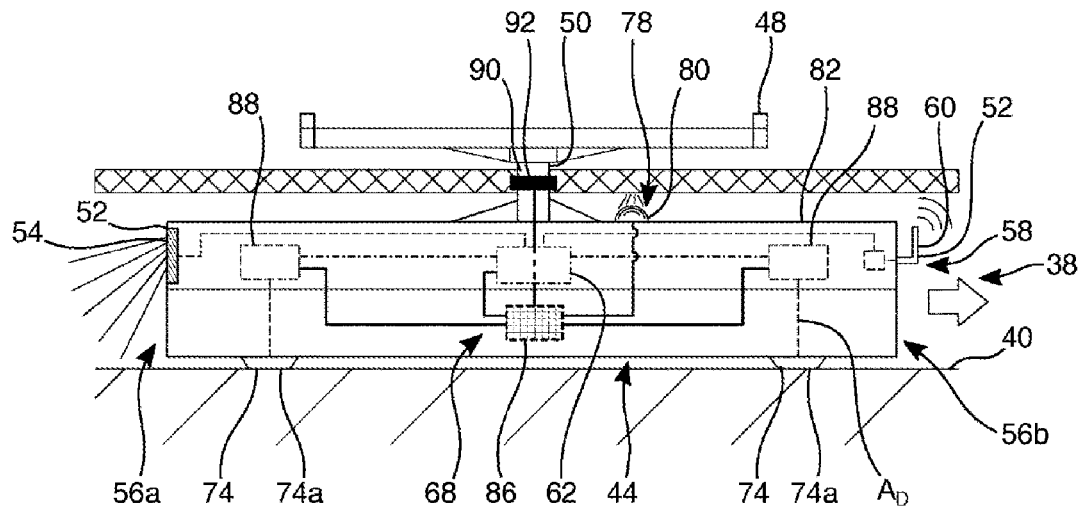

As illustrated in FIGS. 2a and 2b, the treatment system 100 according to the present invention now has a track assistance device 68 which, in addition to the control device 62, can adapt the conveying direction $R_F$ and the main alignment $A_H$ of the transport carriage 38 to one another. In this case, the adaptation in the present exemplary embodiment takes place actively and/or passively. This means that the adaptation can be effected via a motor and also without a motor by exerting a guiding resistance on the transport carriage 38.

In the passive case, the present exemplary embodiment of the track assistance device 68 has guide structures 70. These are formed by chassis guide structures 72, although they can possibly also comprise the movement space delimitation 66. The chassis guide structures 72 in the present case are in turn formed as guide channels 72a in the floor 40 of the movement space 42, as shown in FIG. 2a. Wheel arrangements 74 of the transport carriage 38 can roll in these guide channels 72a, which extend along the conveying route $S_F$ and in the conveying direction $R_F$. In this case, the guide channels 72a extend in a manner adapted to the course of the connecting passage 51. The width of the guide channels 72a is dimensioned such that the connecting device 50 is always kept at a tolerance distance $d_A$ from the edges 64a and/or inside surfaces 64b of the connecting passage. The tolerance distance $d_A$ is in particular explained in more detail with reference to FIGS. 7 and 8 and is also only shown therein.

The transport carriage 38 possibly comprises a sensor system, which detects if a wheel arrangement 74 strikes a flank of a guide channel 72a so that a counter-movement can be initiated.

The wheel arrangements 74 of the transport carriage 38 are designed as actively rotatable wheel arrangements 74a. However, they can still be passively rotated about an axis of rotation $A_D$ by a guiding resistance exerted by the guide channels 72a if motor energy is not applied at the axis of rotation $A_D$. The axis of rotation $A_D$ in the present case extends perpendicularly to wheel suspension axes $A_R$ of the wheel arrangements 74a in each case, wherein only some wheel suspension axes $A_R$ are shown in FIGS. 4a to 5e. If a transport carriage 38 deviates from the optimum track, a guiding resistance can be exerted on the wheel arrangements 74a by inside walls 76 of the guide channels 72a, whereby the transport carriage 38 is prevented from deviating even further from the optimum region through which the connecting device 50 should move.

In addition to this, or possibly also alternatively, the exemplary embodiment according to FIGS. 2a and 2b has a near-field sensor arrangement 78 which, in the present case, comprises at least one camera 80. The camera 80 is arranged on an upper side 82 of the chassis housing 46 and is directed toward an underside 84 of the connecting passage 51. The camera 80 records an edge 64a or inside surface 64b of the connecting passage 51 there continuously or at specified intervals depending on requirements. Position raw information determined thereby is transferred to a track control unit 86 arranged in the transport carriage 38. The camera can optionally likewise be arranged in front of or behind a section of the connecting device 50 which projects through the connecting passage 51. It is likewise possible to direct the camera 80 toward an upper side of the connecting passage 51, which is not denoted by a reference sign.

Figure 9:
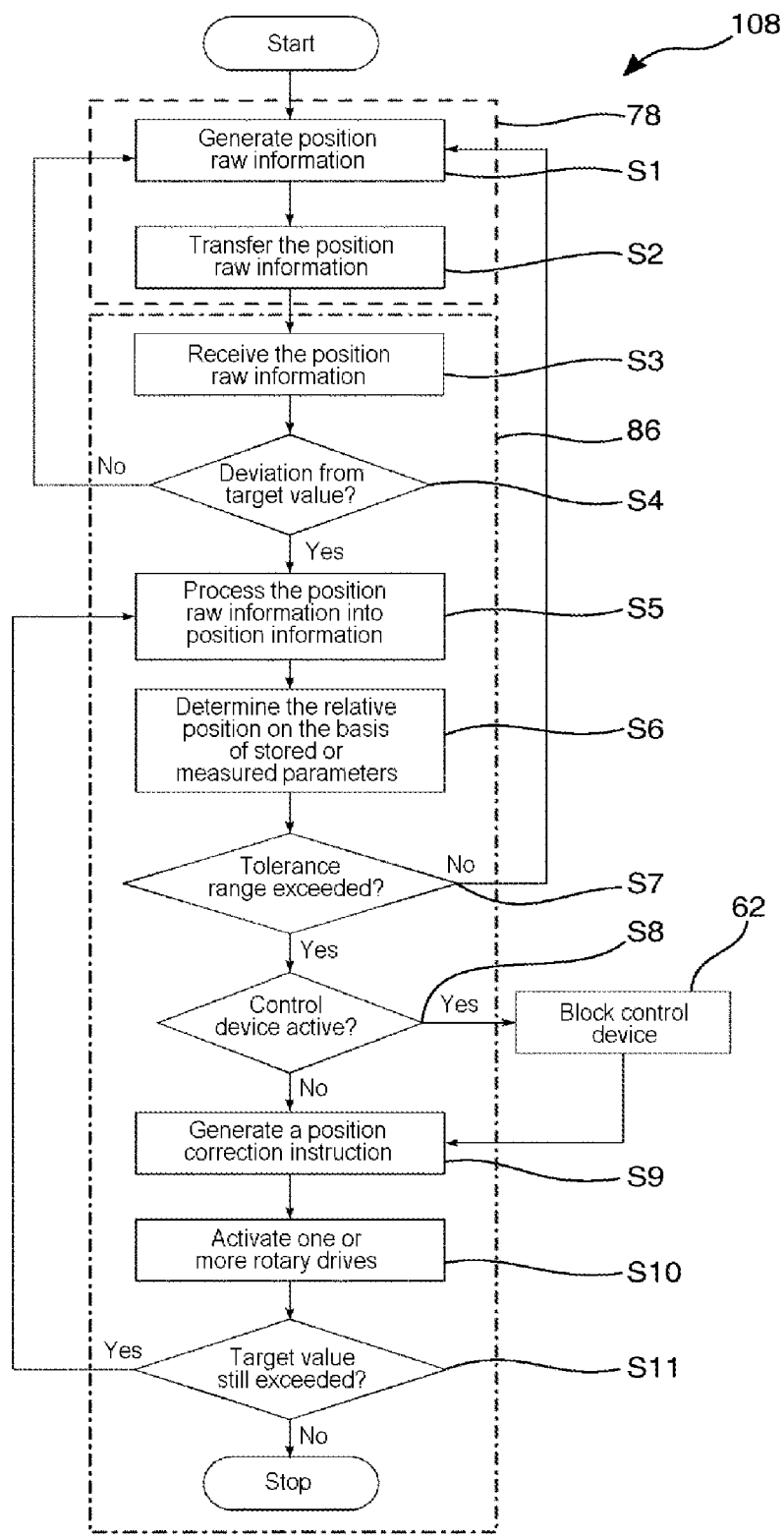
FIG. 9 shows a schematic illustration of a method executed by a track control unit in a flow chart.

The track control unit 86 compares this position raw information firstly with stored and fixed target values (see also step S4 in FIG. 9). As mentioned at the outset, the system can operate for example using brightness values or contrast values. If, for example, a mean brightness value of the image recorded by the camera 80 is then brighter than a stored target value for the brightness, the position raw information is processed into position information which enables more precise information relating to the position in which the transport carriage 38 is located with regard to the connecting passage 51. The processing mainly comprises the elimination of background signals so that the position raw information becomes more manageable and comparable. Likewise, during processing, it is checked whether the transport carriage 38 is still located within the tolerance distance $d_A$ from the edge 64a or inside surface 64b of the connecting passage. It is, however, also possible to compare the position information not directly with the tolerance distance $d_A$ but with tolerance ranges determined via tests, in which the position information of a particular source may move.

The track control unit 86 now detects for example that the camera 80 is located directly under the connecting passage 51 and therefore has to perform a position correction movement along the conveying direction $R_F$ to the right. This position correction movement is performed until the position information processed by the track control unit 86 is back within target limits.

For the position correction movement, the track control unit 86 generates a position correction instruction as a result of which rotary drives 88, which are coupled to actively rotatable wheel arrangements 74a, are controlled such that the associated wheel arrangement 74a of a moving transport carriage 38 is rotated about the axis of rotation $A_D$. A rotary drive 88 can be provided as a separate modular unit or simply realized by presenting options via the control technology; this will be discussed again in more detail below.

However, the camera 80 can likewise also detect a course of the edge 64a or the inside surface 64b of the connecting channel 51, for example via edge identification. This procedure for generating a position correction instruction is substantially less susceptible to possible processing errors than the procedure which uses brightness values as described above. The track control unit 86 then compares the position raw information with a stored target course, for example via an edge identification algorithm. Through transformation of a determined actual course to the target course, a position correction instruction can then be generated indirectly, as a result of which the rotary drives 88 can be controlled such that the actual course corresponds substantially to the target course.

The track control unit 86 essentially takes over the control of the transport carriage 38 when this is located in the region of a connecting passage 51, and the control device 62 is blocked.

The control device 62 can possibly still be initially active during the process described above, or when arriving at the connecting passage 51. The control device 62 and the track control unit 86 must then be prevented from competing in terms of instruction authority. To prevent the transport carriage 38 remaining stationary as a result of this conflict and therefore causing a delay in production, the track control unit 86 can block the control device 62 if the position information is outside a tolerance range for the position information or, additionally or alternatively, if the tolerance distance $d_A$ is exceeded. The track control unit 86 then controls the transport carriage 38 autonomously. In the absence of position information which fulfills the criteria mentioned above, the blocking instruction for the control device 86 is no longer maintained, whereby the control device 62 can take over the control of the transport carriage 38 again.

In the present exemplary embodiment, the near-field sensor arrangement 78 of the transport carriage 38 additionally comprises a contact element 90, which can be a rolling element or a sliding element, which is arranged on the connecting device 50 and which comprises a force sensor 92, which can detect a force exerted on the contact element 90. Depending on this detected force, the track control unit 86 then generates a position correction instruction for the wheel arrangements 74a. The position raw information provided by the force sensor 92 can be processed by the track control unit 86, together with position raw information provided by the camera 80. Particularly reliable position determination is therefore possible. Alternatively, it is possible to dispense with the camera 80 or an optical system in general and only use the contact element 90.

Figure 3A:
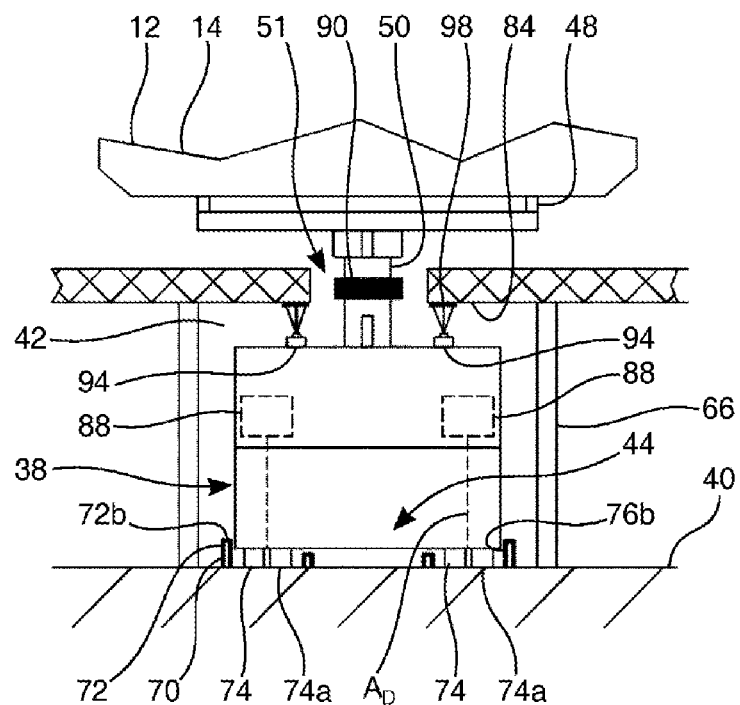
FIGS. 3a and 3b each show sections corresponding to FIGS. 2a and 2b of a treatment system with a second exemplary embodiment of an inventive track assistance device.
Figure 3B:
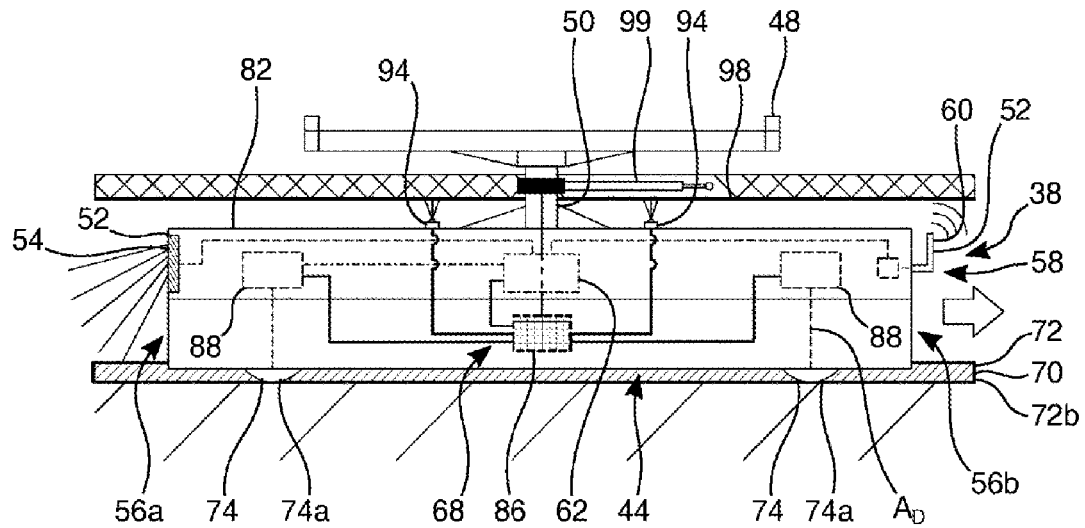

A modification of the track assistance device 68 is shown in FIGS. 3a and 3b.

Firstly, the mechanical chassis guide structures 72 therein are not designed as guide channels 72a but as guide plates 72b. Similarly to the guide channels 72a, the guide plates 72b extend along the conveying route $S_F$ such that they are matched to the connecting passage 51 and are consistent with the varying conveying direction $R_F$. The guide plates 72b likewise have inside walls 76b, which can exert a guiding resistance on wheel arrangements 74.

As a further difference with respect to the exemplary embodiment of FIGS. 2a and 2b, instead of a camera 80, the track assistance device 68 in this case has two optical scanners 94, which are designed for example as laser scanners (not denoted by a separate reference sign). These continuously direct a light beam 96 onto marker elements 98 arranged on the underside 84 of the connecting passage 51. In modifications which are not shown separately, the light can predominantly be made up of the red or infrared spectral range. The marker elements 98 can be designed both as optically scannable structures, for example as a continuous barcode, or as regularly repeating geometrical structures. The marker elements 98 in further exemplary embodiments can likewise be arranged along the movement space delimitation 66.

In modifications which are not shown separately, one or more ultrasound or radar sensors can alternatively or additionally be present, which cooperate with reflective structures so that it is possible to determine position raw information which can be processed into position information by the track control unit 86.

In the present exemplary embodiment, the optical scanners 94 continuously measure the reflection spectrum of the light reflected by the marker elements 98 which is incident on a photosensitive sensor (not shown). In comparison to the previous exemplary embodiment, the exemplary embodiment illustrated in FIGS. 3a and 3b does not have a force sensor 92 arranged in a contact element 90. Instead, a measuring sensor 99 is arranged on the connecting device 50, which is positioned ahead of the connecting device 50 in the connecting passage 51 in the direction of the forward movement. Variations in the course of the connecting passage 51 can thus be detected promptly. In this case, the measuring sensor 99 can be arranged on a movable guide (not illustrated).

In an exemplary embodiment which is not shown, a force sensor 92 designed as a strain gauge is additionally or possibly alternatively arranged on the connecting device 50, which force sensor is comprised by the near-field sensor arrangement 78. This force sensor can detect minimum reversible deflections of the connecting device 50 as it slides or rolls along the edge 64a or inside surface 64b of the connecting passage 51 or strikes said edge or inside surface. In this case, the position raw information generated by the strain gauge is handled by the track control unit 86 in a manner comparable to the other force sensors 92. Similarly to the camera 80 and other force sensors 92, this position raw information is continuously compared with target values. If the position raw information deviates from the target values, the position raw information is processed into position information by the track control unit 86. If this averaged position information exceeds a tolerance range, the track control unit generates a position correction instruction, whereby the rotary drives 88 are activated. This is then the case, for example, if the light of the optical scanner 94 is no longer incident on the marker elements or if the force sensors measure a force which is above a noise value.

As was the case in the exemplary embodiment of FIGS. 2a and 2b, the track control unit 86 then generates a position correction instruction until the connecting device 50 is again located at a tolerance distance $d_A$ from the edge 64a or the inside surface 64b of the connecting passage 51.

Figure 4A:
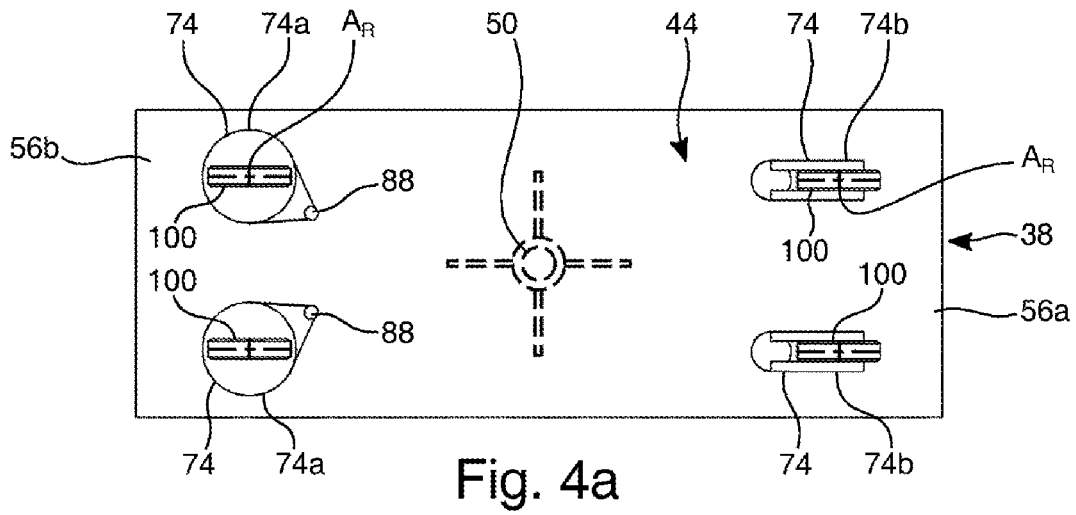
FIGS. 4a to 4c show views from below of the respective chassis of different free-moving transport carriages, wherein four wheel arrangements are shown in each case, which can be actively rotatable or passively rotatable and each have one or two wheels.
Figure 4B:
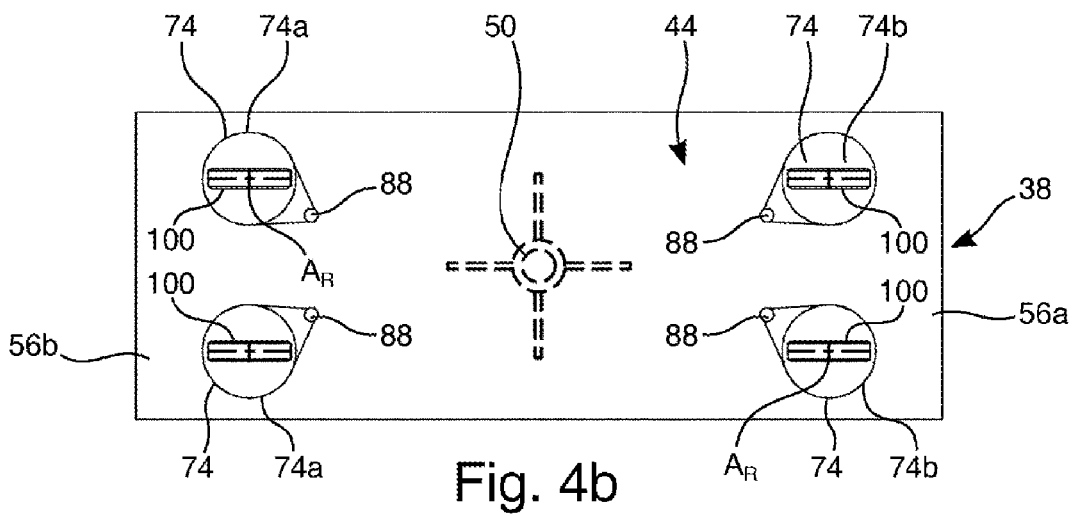
Figure 4C:
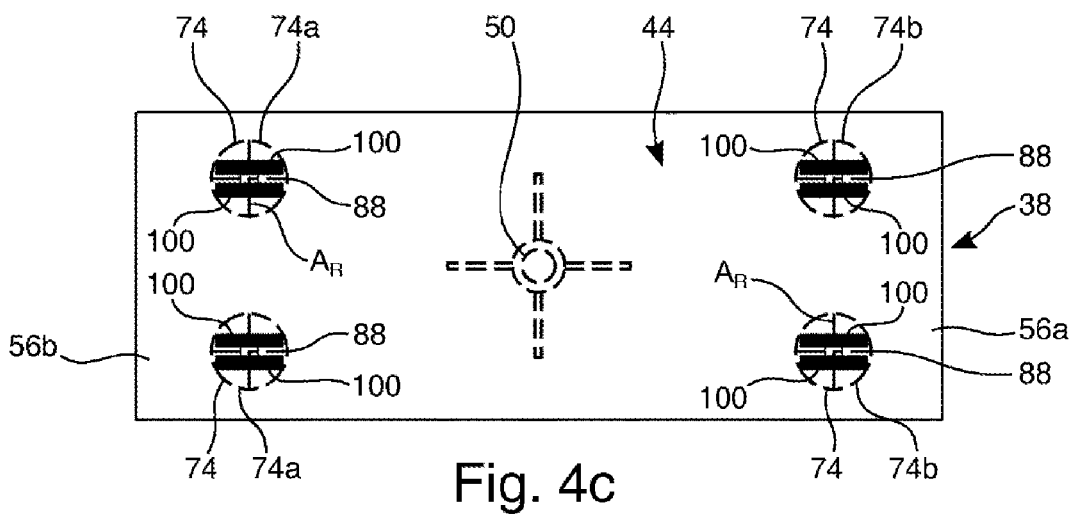

Three exemplary embodiments of possible configurations of the chassis 44 are now illustrated in FIGS. 4a to 4c. The free-moving transport carriages 38 are each shown from below. The transport carriage 38 shown in FIG. 4a has actively rotatable wheel arrangements 74a in the front region 56b, which are each coupled to a rotary drive 88 and on which a wheel 100 is arranged in each case. In this case, the axis of rotation $A_D$ intersects the steering axis. Arranged in the rear region 56a are three rotatable wheel arrangements 74b of a different type, in which the axis of rotation $A_D$ does not intersect the steering axis; the steering axis or the steering bearing is identified by a circle in this case, which is offset with respect to the axis of rotation $A_D$ in the direction of the front region 56b. The transport carriage in FIG. 4b has four actively rotatable wheel arrangements 74a, each with a wheel 100 arranged thereon. In FIG. 4c, a transport carriage 38 is shown which has four actively rotatable wheel arrangements 74a, each with two wheels 100 arranged thereon. The rotary drive 88 in the case of such wheel pairs with two wheels 100 is preferably formed in that the two wheels 100 can be rotated in opposite directions so that the wheel pair, i.e. the wheel arrangement 74a formed thereby, rotates about the axis of rotation $A_D$ overall.

Further exemplary embodiments are not illustrated separately for the sake of simplicity and clarity. A first of these further exemplary embodiments has, in the rear region 56a, fixed wheel arrangements 74 with respect to a rotation, which are consequently not rotatable about an axis of rotation $A_D$ and, in this regard, can also not be deflected. In a second exemplary embodiment, three actively rotatable wheel arrangements 74a are arranged along a circumference of a circle. Exemplary embodiments which are not shown can also have merely three or even five or more wheel arrangements 74.

In FIGS. 5a to 5e, an exemplary embodiment of the transport carriage 38 is shown in a plurality of movement phases in a curved region 36. The transport carriage 38 moves along the conveying route $S_F$ with a varying conveying direction $R_F$. The conveying route $S_F$ has a curved section 102 in the curved region 36. It can be seen that the track control unit 86 controls the transport carriage 38 along the conveying route $S_F$ in such a way that the main alignment $A_H$ corresponds to the conveying direction $R_F$ from the entry into the curved section 102 in FIG. 5a to the position according to FIG. 5c.

This is realized in that the wheel suspension axes $A_R$ of the wheel arrangements 74 which are located in the curved section 102 are always aligned by the track control unit 86 in such a way that they are directed toward a curvature center point M of the curved section 102 and continue as such during the movement along the curved section 102. In order to provide the track control unit 86 with further position raw information in addition or alternatively to the options mentioned above, a respective rotary encoder (not illustrated) can be provided for each wheel arrangement 74, which rotary encoder relays a rotary position of the wheel arrangement 74 to the track control unit 86 and is comprised by the near-field sensor arrangement 78. These rotary positions can then be compared with predefined rotary positions for particular sections of the conveying route $S_F$ by the track control unit 86 and matched thereto in the event of deviations from the target values.

The fact that the main alignment $A_H$ does not always extend parallel to the current conveying direction $R_F$ in each case is shown in FIGS. 5d and 5e. The main alignment $A_H$ here extends perpendicularly to the conveying direction $R_F$ and the transport carriage 38 is moved sideways and transversely to its longitudinal axis $A_H$.

In a manner similar to FIGS. 5a to 5e, a further exemplary embodiment of a transport carriage 38 is illustrated in FIGS. 6a to 6d. In this transport carriage 38, the connecting device 50 comprises two vertical struts, which are denoted therein by 50a and 50b and are at a distance from one another in the direction of the longitudinal axis $A_H$.

The near-field sensor arrangement 78 in this case is matched to the two struts 50a, 50b present. By way of example, a separate respective camera 80 is present for each strut 50a, 50b, which scans the connecting passage 51 in front of each strut 50a, 50b. The same applies accordingly for more than two struts 50 or the like.

This exemplary embodiment and FIGS. 6a to 6d and 7 and 8 show how the main alignment $A_H$ and the conveying direction $R_F$ can be adapted to one anther by means of the inventive track assistance device 68 in the event of chordal effects. Such "chords", which are denoted by 104 in FIGS. 6a to 6d, always form when more than one for example rod-shaped section of the connecting device 50 extends through the connecting passage 51. The control of the transport carriage 38 along a curved section must then be treated as if an object with the longitudinal extent of the chord 104 is being conveyed along the connecting passage 51.

Figure 8:
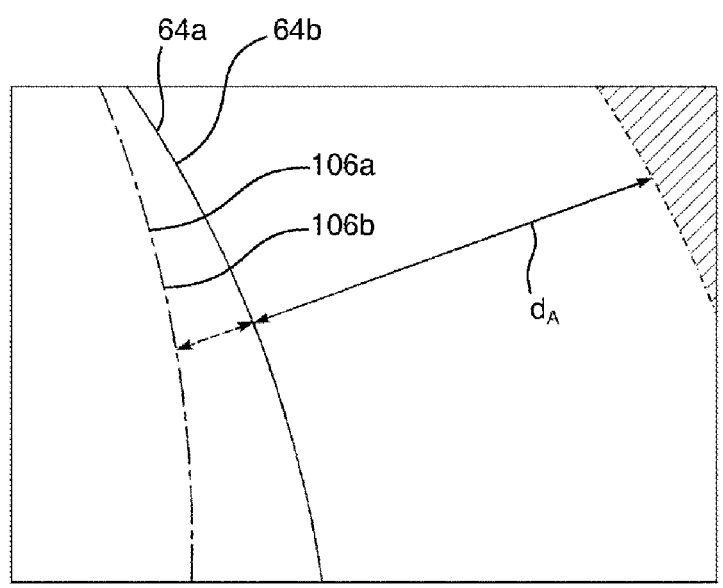
FIG. 8 shows an enlargement of the region VIII of FIG. 7, wherein a target course of an edge and/or inside surface of the connecting passage is illustrated by a dashed line.

To this end, FIG. 7 shows a detailed view of the transport carriage 38 in the curved section 102 of the conveying route $S_F$ in the position according to FIG. 6b. Likewise shown are the tangential vectors $V_T$ of the conveying direction $R_F$ with respect to various positions of the transport carriage 38 in the curved region 36. FIG. 8 shows the detail VIII in FIG. 7 on an enlarged scale and illustrates the tolerance distance $d_A$ at which the connecting device 50 is kept at least from the edge 64a or the inside surface 64b of the connecting passage 51.

An actual course 106a of the edge 64a or the inside surface 64b and a target course 106b of the edge 64a or the inside surface 64b are shown. When determining this deviation of the actual course 106a from the target course 106b, the track control unit 86 generates a position correction instruction whereby the wheel arrangements 74 are controlled by the rotary drives 88 in such a way that the transport carriage executes a correction movement until the actual course 106 and the target course 106 substantially correspond again. In this case, the precise target course 106b is especially dependent on how the tolerance distance $d_A$ is measured or predetermined.

FIG. 9 shows a flow chart of a method 108 executed by the track control unit 86. Position raw information is constantly generated by the near-field sensor arrangement 78 in step S1, which is transferred to the track control unit 86 in step S2. In Step S4, after receiving the position raw information in step S3, it is then checked in the track control unit 86 whether a specified target value has been exceeded by the relayed position raw information. If this is not the case, the method 108 jumps back to step S1. However, if a target value is exceeded, the position raw information is processed into position information in step S5 by the track control unit 86. On the basis of stored or measured parameters, this position information is now used in step S6 to determine a relative position of the transport carriage 38 with regard to a movement environment, in particular with regard to the edge 64a or inside surface 64b of a connecting passage 51.

In the exemplary embodiments shown, the point with regard to which the relative position is determined is in each case the location or locations on the transport carriage 38 at which the camera 80 or the optical scanner 94 are arranged. In exemplary embodiments which are not shown separately, a representation of relevant points of the transport carriage 38 in an XYZ coordinate system is stored in the track control unit 86. Using the position information with which a relative position of the camera 80 or the optical scanner 94 with regard to the movement environment can be determined, the relative position of the connecting device 50 or other points of the transport carriage 38 relative to the movement environment can also be determined by a corresponding matrix transformation.

In a method step S7, it is now checked whether the point whereof the relative position was determined by means of the position information has exceeded a tolerance distance $d_A$ with regard to the movement environment. If this is not the case, the method begins again with step S1. However, if this is the case, it is checked in step S8 of the method 108 whether a control device 62 is active and relaying control instructions to the chassis 44 of the transport carriage 38. To prevent production failures, in particular owing to competition in terms of the instruction authority, the track control unit 86 blocks the control device 62 for the time in which the track control unit 86 controls the transport carriage 38. In this case, the track control unit 86 controls not only the rotary drives 88 but also the other drive mechanisms of the transport carriage 38, which are not illustrated separately for the sake of clarity.

In a method step S9, a position correction instruction is then generated, on the basis of which the rotary drives 88 of the wheel arrangements 74 are activated in a method step S10.

As soon as the position raw information relayed by the near-field sensor arrangement 78 is no longer above or below the stored target value, the control device 62 takes over the control of the transport carriage 38 again, i.e. upon or after its departure from the movement space 42, for example.

Although not shown in FIG. 9, this additionally requires the control device 62 to execute a similar method. In this regard, for example, a blocking instruction of the track control unit 86 can also be ignored due to a far-field sensor arrangement 54 of the control device 62 determining position information which enables inferences about the design of the movement environment of the transport carriage 38 following a comparison with target values provided for this purpose.

In a further exemplary embodiment which is not shown, in order to prevent the track control unit 86 taking over the control of the transport carriage 38 owing to target values being exceeded or not being reached even though such a precise control is not required, the track control unit 86 is only activated when a specific marker is detected by the far-field sensor arrangement 54. This marker can be arranged for example at an entry to a movement space 42 below a workpiece conveying space 34. Accordingly, a further marker can then be arranged at an exit of the movement space 42, which causes a blocking instruction of the track control unit 86 to be ignored or, alternatively, the track control unit 86 to be deactivated. It can then be reactivated when a corresponding marker is detected again.

What is claimed is:

1. A free-moving transport carriage for conveying at least one workpiece along a conveying route in variable conveying directions, comprising:
   a) a chassis, which defines a main axis and a main alignment of the free-moving transport carriage, a fastening device for at least one workpiece and a connecting device which couples the chassis to the fastening device;
   b) a control device which is designed to control the chassis along the conveying route depending on position information which is provided by at least one position information transmitter; and
   c) a near-field sensor arrangement which can be coupled to a track control unit, wherein, via position raw information which can be determined by the near-field sensor arrangement, the track control unit can determine a relative position of one or more points of the free-moving transport carriage with regard to one or more position information sources of a near-field movement environment, the track control unit being configured to temporarily disable the control device to autonomously control and guide the chassis along at least a portion of the conveying route; and
   d) the main alignment of the free-moving transport carriage and a conveying direction can be adapted to one another by the track control unit.

2. The free-moving transport carriage as claimed in claim 1, the track control unit is arranged on or in the free-moving transport carriage.

3. The free-moving transport carriage as claimed in claim 1, wherein the near-field sensor arrangement comprises
   a) at least one camera or an optical scanner, and/or at least one ultrasound sensor and/or at least one radar sensor, which is arranged on the free-moving transport carriage and, by means of a camera image and/or optically scannable structures and/or reflective structures, can determine position raw information which can be processed into position information by the track control unit; and/or
   b) at least one force sensor, which is arranged on the connecting device or on a chassis housing and is designed to indirectly or directly detect if the connecting device strikes an obstacle, and/or
   c) at least one rotary encoder, which is designed to indicate a rotary position of at least one wheel arrangement.

4. The free-moving transport carriage as claimed in claim 1, wherein the chassis has one or more actively rotatable wheel arrangements, which
   a) are each actively rotatable about an axis of rotation which extends perpendicularly, in particular vertically, to a wheel suspension axis; and
   b) can be coupled to the track control unit via a rotary drive in such a way that the track control unit, depending on the position raw information which can be determined by the near-field sensor arrangement, activates one or more rotary drives in such a way that the respectively activated rotary drive induces a rotation of the corresponding actively rotating wheel arrangement about the axis of rotation.

5. The free-moving transport carriage as claimed in claim 4, wherein at least one of the one or more actively rotatable wheel arrangements can be rotated individually by means of the track control unit.

6. A conveying system for conveying at least one workpiece along a conveying route in variable conveying directions comprising at least one free-moving transport carriage as claimed in claim 1.

7. A treatment system for treating workpieces comprising:
   a) a conveying system which comprises a plurality of free-moving transport carriages with which at least one workpiece in each case can be conveyed along a conveying route in variable conveying directions, wherein
   b) each free-moving transport carriage comprises
      ba) a chassis which defines a main axis and main alignment of the free-moving transport carriage, a fastening device for at least one workpiece and a connecting device, which couples the chassis to the fastening device; and
      bb) a control device which is designed to control the chassis along the conveying route depending on position information which is provided by at least one position information transmitter;
   c) a movement space is present along the conveying route, the movement space being connected to a workpiece conveying space via a connecting passage, wherein the chassis can be moved in the movement space so that the fastening device is also moved in the workpiece conveying space and the connecting device extends through the connecting passage, wherein
   d) in addition to the control device of the free-moving transport carriage, a mechanical and/or sensor-dependent track assistance device is provided, which is designed to actively and/or passively adapt the main alignment of the free-moving transport carriage and the conveying direction to one another on the basis of at least one parameter which is dependent on the connecting passage, and
      further wherein the at least one parameter which is dependent on the connecting passage is at least indirectly
         the course of an edge and/or an inside surface of the connecting passage in the conveying direction; and/or an inclination of the inside surface of the connecting passage with respect to a vertical plane extending in the conveying direction; and/or
a local width of the connecting passage.

8. The treatment system as claimed in claim 7, wherein the main alignment of the free-moving transport carriages and the conveying direction are adapted to one another by the track assistance device in such a way that
a) after or during an adaptation of the free-moving transport carriage, the main alignment always extends or is kept parallel or perpendicular to the conveying direction; and/or
b) after or during the adaptation, at least a section of the connecting device, which extends through the connecting passage, is, or is kept, at a predetermined tolerance distance from at least an edge and/or an inside surface of the connecting passage.

9. The treatment system as claimed in claim 8, wherein the tolerance distance is at least 3 to 7 mm.

10. The treatment system as claimed in claim 7, wherein
a) for active adaptation of the main alignment and the conveying direction to one another, the track assistance device has at least one near-field sensor arrangement, which is coupled to a track control unit, wherein
b) via position raw information which can be determined by the near-field sensor arrangement, the track control unit can at least indirectly determine a relative position of one or more points of the free-moving transport carriages in each case with regard to one or more parameters which are dependent on the connecting passage.

11. The treatment system as claimed in claim 7, wherein for passive adaptation of the main alignment and the conveying direction to one another along the conveying route, the track assistance device has one or more guide structure, which can exert a guiding resistance in each case on the free-moving transport carriages.

12. The treatment system as claimed in claim 11, wherein one or more guide structures are formed by
a) one or more chassis guide structures, which are arranged within the movement space and which can exert the guiding resistance on the chassis, wherein an axis of rotation extends perpendicularly to a wheel suspension axis; and/or
b) a delimitation of the movement space, which can exert the guiding resistance on a chassis housing of the chassis.

13. The treatment system as claimed in claim 11, wherein a contact element is arranged on the connecting device, which can roll or slide along at least an edge and/or an inside surface of the connecting passage.

14. The treatment system as claimed in claim 7, wherein active and passive components of the adaptation of the main alignment of the transport carriage and the conveying direction to one another can be superimposed.

15. A method executed by a track control unit of a treatment system for treating workpieces and/or a free-moving transport carriage for conveying at least one workpiece along a conveying route in a variable conveying direction, comprising the steps of:
a) controlling movement of the free-moving transport carriage with a control device of the free-moving transport carriage
b) receiving position raw information, which can be provided by a near-field sensor arrangement, which is arranged on the free-moving transport carriage;
c) processing the position raw information into position information with which a relative position of one or more points of the free-moving transport carriage can be determined on the basis of one or more parameters which are dependent on a movement environment, in particular of a connecting passage and/or a movement space of the treatment system; and
d) generating a position correction instruction depending on the determined position information and temporarily overriding the control device, wherein the position correction instruction induces an adaptation of a main alignment, which is defined by a chassis of the free-moving transport carriage, and the variable conveying direction.

16. A treatment system for treating workpieces comprising:
a) a conveying system which comprises a plurality of free-moving transport carriages with which at least one workpiece in each case can be conveyed along a conveying route in variable conveying directions, wherein
b) each free-moving transport carriage comprises
ba) a chassis which defines a main axis and main alignment of the free-moving transport carriage, a fastening device for at least one workpiece and a connecting device, which couples the chassis to the fastening device; and
bb) a control device which is designed to control the chassis along the conveying route depending on position information which is provided by at least one position information transmitter;
c) a movement space is present along the conveying route, the movement space being connected to a workpiece conveying space via a connecting passage, wherein the chassis can be moved in the movement space so that the fastening device is also moved in the workpiece conveying space and the connecting device extends through the connecting passage,
wherein
d) in addition to the control device of the free-moving transport carriage, a mechanical and/or sensor-dependent track assistance device is provided, which is designed to actively and/or passively adapt the main alignment of the free-moving transport carriage and the conveying direction to one another on the basis of at least one parameter which is dependent on the connecting passage, and
further wherein for passive adaptation of the main alignment and the conveying direction to one another along the conveying route, the track assistance device has one or more guide structure, which can exert a guiding resistance in each case on the free-moving transport carriages, wherein one or more guide structures are formed by
one or more chassis guide structures, which are arranged within the movement space and which can exert the guiding resistance on the chassis, wherein an axis of rotation extends perpendicularly to a wheel suspension axis; and/or
a delimitation of the movement space, which can exert the guiding resistance on a chassis housing of the chassis.

17. The treatment system as claimed in claim 16, wherein the main alignment of the free-moving transport carriages and the conveying direction are adapted to one another by the track assistance device in such a way that a) after or during an adaptation of the free-moving transport carriage, the main alignment always extends or is kept parallel or perpendicular to the conveying direction; and/or
b) after or during the adaptation, at least a section of the connecting device, which extends through the connecting passage, is, or is kept, at a predetermined tolerance distance from at least an edge and/or an inside surface of the connecting passage.

18. The treatment system as claimed in claim 17, wherein the tolerance distance is at least 3 to 7 mm.

19. The treatment system as claimed in claim 16, wherein)
a) for active adaptation of the main alignment and the conveying direction to one another, the track assistance device has at least one near-field sensor arrangement, which is coupled to a track control unit,
wherein
b) via position raw information which can be determined by the near-field sensor arrangement, the track control unit can at least indirectly determine a relative position of one or more points of the free-moving transport carriages in each case with regard to one or more parameters which are dependent on the connecting passage.

20. The treatment system as claimed in claim 16, wherein a contact element is arranged on the connecting device, which can roll or slide along at least an edge and/or an inside surface of the connecting passage.

21. The treatment system as claimed in claim 16, wherein active and passive components of the adaptation of the main alignment of the transport carriage and the conveying direction to one another can be superimposed.

22. A treatment system for treating workpieces comprising:
a) a conveying system which comprises a plurality of free-moving transport carriages with which at least one workpiece in each case can be conveyed along a conveying route in variable conveying directions, wherein
b) each free-moving transport carriage comprises
ba) a chassis which defines a main axis and main alignment of the free-moving transport carriage, a fastening device for at least one workpiece and a connecting device, which couples the chassis to the fastening device; and
bb) a control device which is designed to control the chassis along the conveying route depending on position information which is provided by at least one position information transmitter;
c) a movement space is present along the conveying route, the movement space being connected to a workpiece conveying space via a connecting passage, wherein the chassis can be moved in the movement space so that the fastening device is also moved in the workpiece conveying space and the connecting device extends through the connecting passage,
wherein
d) in addition to the control device of the free-moving transport carriage, a mechanical and/or sensor-dependent track assistance device is provided, which is designed to actively and/or passively adapt the main alignment of the free-moving transport carriage and the conveying direction to one another on the basis of at least one parameter which is dependent on the connecting passage, and
further wherein active and passive components of the adaptation of the main alignment of the transport carriage and the conveying direction to one another can be superimposed.

23. The treatment system as claimed in claim 22, wherein the main alignment of the free-moving transport carriages and the conveying direction are adapted to one another by the track assistance device in such a way that
a) after or during an adaptation of the free-moving transport carriage, the main alignment always extends or is kept parallel or perpendicular to the conveying direction; and/or
b) after or during the adaptation, at least a section of the connecting device, which extends through the connecting passage, is, or is kept, at a predetermined tolerance distance from at least an edge and/or an inside surface of the connecting passage.

24. The treatment system as claimed in claim 23, wherein the tolerance distance is at least 3 to 7 mm.

25. The treatment system as claimed in claim 22, wherein
a) for active adaptation of the main alignment and the conveying direction to one another, the track assistance device has at least one near-field sensor arrangement, which is coupled to a track control unit,
wherein
b) via position raw information which can be determined by the near-field sensor arrangement, the track control unit can at least indirectly determine a relative position of one or more points of the free-moving transport carriages in each case with regard to one or more parameters which are dependent on the connecting passage.

26. The treatment system as claimed in claim 22, wherein for passive adaptation of the main alignment and the conveying direction to one another along the conveying route, the track assistance device has one or more guide structure, which can exert a guiding resistance in each case on the free-moving transport carriages and a contact element is arranged on the connecting device, which can roll or slide along at least an edge and/or an inside surface of the connecting passage.

* * * * *